United States Patent
Kondo et al.

(10) Patent No.: US 11,750,141 B2
(45) Date of Patent: Sep. 5, 2023

(54) ROTATING MACHINE CONTROL DEVICE

(71) Applicant: Mitsubishi Electric Corporation, Tokyo (JP)

(72) Inventors: Shota Kondo, Tokyo (JP); Masahiro Iezawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/913,158

(22) PCT Filed: Jun. 3, 2020

(86) PCT No.: PCT/JP2020/021860
§ 371 (c)(1),
(2) Date: Sep. 21, 2022

(87) PCT Pub. No.: WO2021/245815
PCT Pub. Date: Dec. 9, 2021

(65) Prior Publication Data
US 2023/0140421 A1 May 4, 2023

(51) Int. Cl.
*H02P 29/64* (2016.01)
*H02P 29/66* (2016.01)

(52) U.S. Cl.
CPC .......... *H02P 29/64* (2016.02); *H02P 29/666* (2016.11)

(58) Field of Classification Search
CPC .................. H02P 29/64; H02P 29/666
See application file for complete search history.

(56) References Cited

U.S. PATENT DOCUMENTS

| 2012/0249024 A1* | 10/2012 | Saha | B60L 15/025 318/400.02 |
| 2013/0020971 A1* | 1/2013 | Gallegos-Lopez | H02P 21/0089 318/400.02 |
| 2016/0226428 A1* | 8/2016 | Kim | H02P 29/666 |

FOREIGN PATENT DOCUMENTS

| JP | 4210992 B2 | 1/2009 |
| JP | 2014-176114 A | 9/2014 |

OTHER PUBLICATIONS

International Search Report and Written Opinion dated Aug. 18, 2020, received for PCT Application PCT/JP2020/021860, filed on Jun. 3, 2020, 8 pages including English Translation.

* cited by examiner

Primary Examiner — Zoheb S Imtiaz
(74) Attorney, Agent, or Firm — XSENSUS LLP

(57) ABSTRACT

A rotating machine control device for controlling a rotating machine having a stator winding and a field winding includes a current command generation unit which generates a current command value on the basis of the temperature of the rotating machine. The current command generation unit includes a constraint condition setting unit which calculates a constraint condition on the basis of a torque command, stator winding voltage, stator winding current, and field winding current, an optimization calculation unit which calculates and outputs the current command value, using the constraint condition and an evaluation function, and a constraint condition update unit which updates the constraint condition on the basis of the temperature of the rotating machine. The current command generation unit calculates and outputs the current command value, using the updated constraint condition.

20 Claims, 10 Drawing Sheets

FIG. 6

| COMMAND MODE | 1 | 2 | 3 | 4 | 5 | 6 | 7 | 8 | 9 | 10 |
|---|---|---|---|---|---|---|---|---|---|---|
| a: TORQUE COMMAND LIMITATION | 0 | 0 | 0 | 1 | 0 | 0 | 0 | 1 | 1 | 1 |
| b: VOLTAGE LIMITATION | 0 | 0 | 0 | 0 | 1 | 1 | 1 | 1 | 1 | 1 |
| c: FIELD WINDING CURRENT LIMITATION | 0 | 1 | 0 | 1 | 0 | 1 | 0 | 1 | 0 | 1 |
| d: STATOR WINDING CURRENT LIMITATION | 0 | 0 | 1 | 1 | 0 | 0 | 1 | 0 | 1 | 1 |
| CONSTRAINT CONDITION (EXPRESSION No.) | 4 | 6 | 8 | 10 | 12,13 | 15,16 | 17,18 | 19 | 21 | 23 |
| EVALUATION FUNCTION (EXPRESSION No.) | 5 | 7 | 9 | 11 | 14 | — | — | 20 | 22 | 24 |

ROTATING MACHINE CONTROL DEVICE

CROSS-REFERENCE TO RELATED APPLICATION

The present application is based on PCT filing PCT/JP2020/021860, filed Jun. 3, 2020, the entire contents of which are incorporated herein by reference.

TECHNICAL FIELD

The present disclosure relates to a rotating machine control device.

BACKGROUND ART

When a winding temperature is increased, it is general that a current-application amount for the winding is reduced for protecting a rotating machine from overheating.

For example, it is disclosed that a plurality of current command maps for a stator winding and a field winding are prepared in accordance with temperatures of the stator winding and the field winding, whereby a current command value for the higher-temperature one of the stator winding and the field winding is reduced and a current command value for the lower-temperature one is increased, thus suppressing reduction of output torque (see, for example, Patent Document 1).

CITATION LIST

Patent Document

Patent Document 1: Japanese Laid-Open Patent Publication No. 2014-176114
Patent Document 2: Japanese Patent No. 4210992

SUMMARY OF THE INVENTION

Problems to be Solved by the Invention

In Patent Document 1, it is necessary to prepare a current command map in accordance with each winding temperature in advance, and as the number of parameters (e.g., rotating machine parameters such as the number of revolutions, a resistance, and an inductance, DC voltage, and a rotation speed) increases, patterns that can be taken by the current commands exponentially increases. In particular, a rotating machine having a field winding has a large number of parameters. Therefore, there are an enormous number of current command patterns in accordance with temperatures, and it is difficult to have these patterns as maps.

Meanwhile, Patent Document 2 discloses updating current command values for a stator winding and a field winding so as to minimize copper loss from a torque command value without using current command maps. However, in Patent Document 2, although there are no current command maps, temperature information is not taken into consideration. Therefore, when the rotating machine temperature is increased, reduction of output torque and overheating of the rotating machine are not suppressed.

The present disclosure has been made to solve the above problem, and an object of the present disclosure is to provide a rotating machine control device that can generate a current command value so that loss is reduced and torque is not reduced, while appropriately protecting a rotating machine from heat generation, without using current command maps.

Solution to the Problems

A rotating machine control device according to the present disclosure is a rotating machine control device for controlling a rotating machine having a stator winding and a field winding, the rotating machine control device including: a temperature information acquisition unit which acquires a temperature of the rotating machine; and a current command generation unit which generates a current command value on the basis of the temperature of the rotating machine acquired by the temperature information acquisition unit. The current command generation unit includes a constraint condition setting unit which calculates a constraint condition on the basis of conditions of a torque command, stator winding voltage, stator winding current, and field winding current, an optimization calculation unit which calculates and outputs the current command value, using the constraint condition and an evaluation function set on the basis of the torque command, the stator winding voltage, the stator winding current, and the field winding current, and a constraint condition update unit which updates the constraint condition on the basis of the temperature of the rotating machine acquired by the temperature information acquisition unit. The current command generation unit calculates and outputs the current command value, using the updated constraint condition.

Effect of the Invention

A rotating machine control device according to the present disclosure makes it possible to provide a rotating machine control device that can generate a current command value so that loss is reduced and torque is not reduced, while appropriately protecting a rotating machine from heat generation, without using current command maps.

BRIEF DESCRIPTION OF THE DRAWINGS

FIG. 6 shows conditions of ten command modes generated in the current command generation unit.

DESCRIPTION OF EMBODIMENTS

Figure 1:
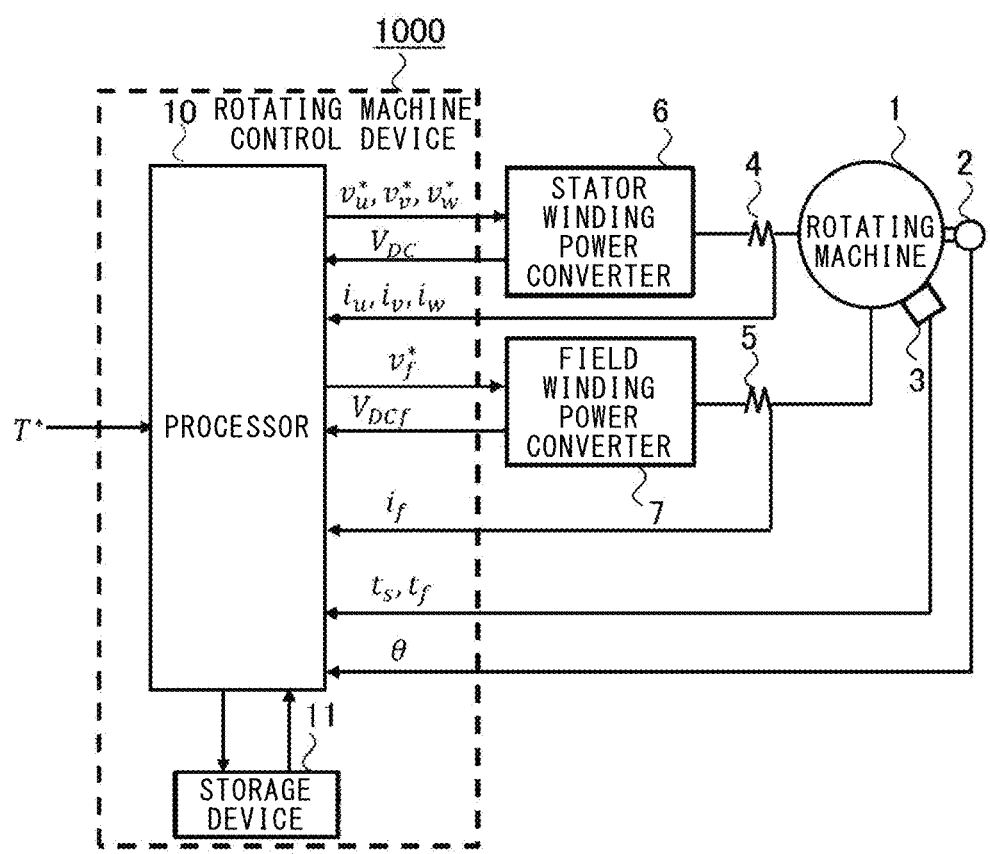
FIG. 1 shows the hardware configuration of a rotating machine control device according to embodiment 1.

Hereinafter, the present embodiment will be described with reference to the drawings. In the drawings, the same reference characters denote the same or corresponding parts. A rotating machine is assumed to be, for example, an AC electric generator, a motor, or a rotating machine of a driving device or the like. Here, as an example, a vehicular AC electric generator mounted to a vehicle is assumed.

Embodiment 1

Hereinafter, a rotating machine control device according to embodiment 1 will be described.

FIG. 1 shows the hardware configuration of the rotating machine control device according to embodiment 1, and shows the entire system including a rotating machine which is a control target. In FIG. 1, a rotating machine control device 1000 performs drive control for the rotating machine 1, and is connected to windings of a rotating machine 1 respectively via a stator winding power converter 6 and a field winding power converter 7 described later. In addition, the rotating machine control device 1000 is connected to a position detector 2 and a temperature detector 3 provided to the rotating machine 1. Further, the rotating machine control device 1000 is connected to current detectors 4 and 5 which are respectively connected in series between the rotating machine 1, and the stator winding power converter 6 and the field winding power converter 7.

In FIG. 1, the rotating machine control device 1000 includes a processor 10 and a storage device 11.

The storage device 11 includes a volatile storage device such as a random access memory and a nonvolatile auxiliary storage device such as a flash memory (not shown). The storage device 11 may include an auxiliary storage device such as a hard disk, instead of the nonvolatile auxiliary storage device.

The processor 10 executes a program inputted from the storage device 11. Since the storage device 11 includes the auxiliary storage device and the volatile storage device, the program is inputted from the auxiliary storage device to the processor 10 via the volatile storage device. In addition, the processor 10 may output data such as a calculation result to the volatile storage device of the storage device 11, or may store such data into the auxiliary storage device via the volatile storage device.

The rotating machine 1 is used as, for example, a vehicular AC electric generator, and has a permanent magnet and a field winding at a rotor and has a three-phase stator winding at a stator (not shown). The rotating machine 1 may or may not have a permanent magnet, and may have two or more three-or-more-phase stator windings at the stator.

The position detector 2 is, for example, a resolver, and is provided to a rotary shaft of the rotating machine 1, to detect an angle θ of a rotor. As an alternative to the position detector 2, a position estimator for estimating the angle θ of the rotor may be used.

The temperature detector 3 detects a temperature is of the stator winding and a temperature tf of the field winding. As an alternative to the temperature detector 3, a temperature estimator for estimating the temperatures of the stator winding and the field winding may be used. In addition, not only the temperatures of the stator winding and the field winding but also the temperature of a component such as a magnet composing the rotating machine and the temperature of a power converter or the like may be detection targets or estimation targets.

The current detector 4 detects currents iu, iv, iw for the respective phases of the stator winding, and the current detector 5 detects field winding current if. One or both of the current detectors 4 and 5 may be replaced with a current estimator for estimating the currents iu, iv, iw of the stator winding and the field winding current if.

The stator winding power converter 6 generates voltage corresponding to three-phase voltage command values vu*, vv*, vw*, using a known method such as pulse width modulation (PWM) or pulse amplitude modulation (PAM). In addition, the stator winding power converter 6 detects stator winding DC link voltage VDC to be used for power conversion.

The field winding power converter 7 generates voltage corresponding to the voltage command value vf*, using a known method such as PWM or PAM, as in the stator winding power converter 6. In addition, the field winding power converter 7 detects field winding DC link voltage VDCf to be used for power conversion.

Figure 2:
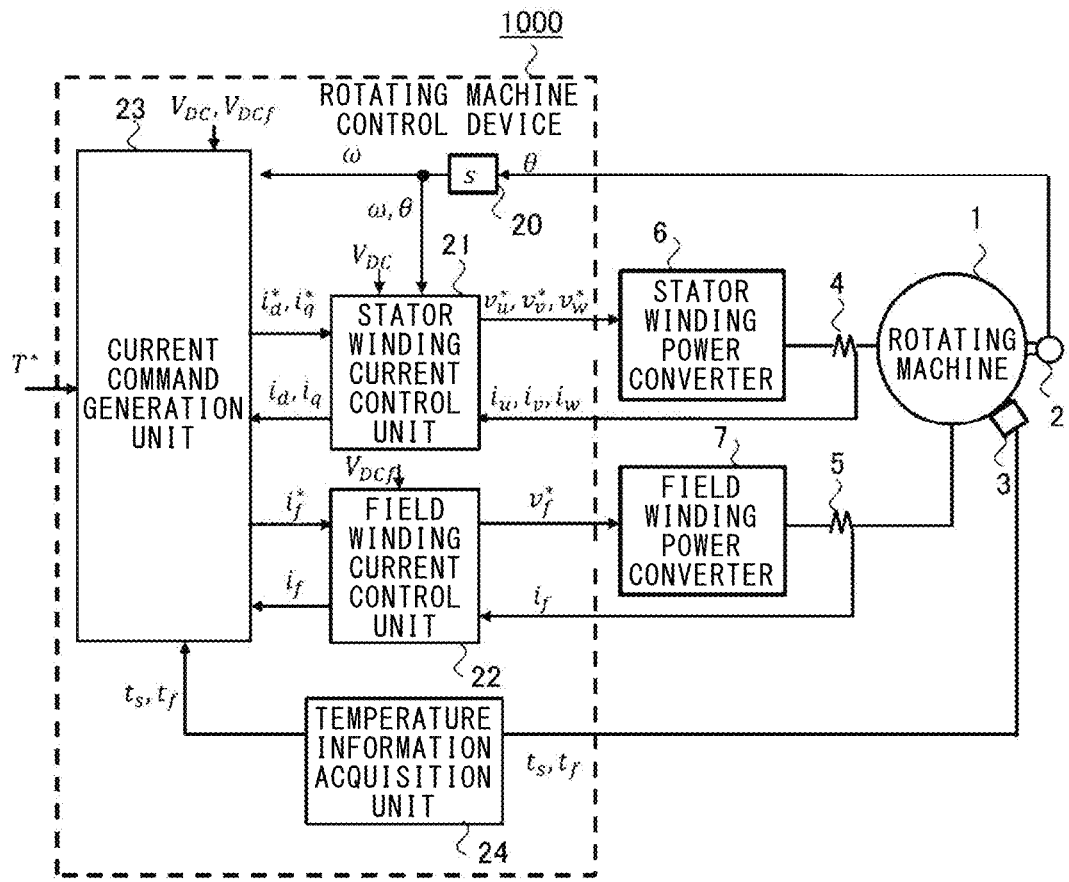
FIG. 2 is a block diagram showing the configuration of the rotating machine control device according to embodiment 1.

FIG. 2 is a block diagram showing the function of the rotating machine control device 1000 according to embodiment 1. In FIG. 2, the rotating machine control device 1000 includes a differentiator 20, a stator winding current control unit 21, a field winding current control unit 22, a current command generation unit 23, and a temperature information acquisition unit 24. Here, one current control unit is provided for each winding. In each current control unit, decoupling control may be performed using a known method, considering interference between the windings.

The differentiator 20 differentiates the angle θ of the rotor detected by the position detector 2, to calculate a velocity ω of the rotor.

The stator winding current control unit 21 converts the currents iu, iv, iw for the respective phases of the stator winding detected by the current detector 4, to stator winding currents id, iq, and calculates stator winding voltage command values vu*, vv*, vw* so that the stator winding currents id, iq coincide with stator winding current command values id*, iq* calculated by the current command generation unit 23.

The field winding current control unit 22 calculates a field winding voltage command value vf* so that the field winding current if detected by the current detector 5 coincides with a field winding current command value if* calculated by the current command generation unit 23.

The temperature information acquisition unit 24 acquires the stator winding temperature ts and the field winding temperature tf detected by the temperature detector 3.

The current command generation unit 23 calculates the stator winding current command values id*, iq* and the field winding current command value if*, on the basis of a torque command T*, the rotor velocity ω calculated by the differentiator 20, the stator winding DC link voltage VDC detected by the stator winding power converter 6, the field winding DC link voltage VDCf detected by the field winding power converter 7, the stator winding temperature ts and the field winding temperature tf acquired by the temperature information acquisition unit 24, a stator winding current limitation value idqlim, a field winding current limitation value iflim, the stator winding currents id, iq converted by the stator winding current control unit 21, and the field winding current if converted by the field winding current control unit 22.

Next, the stator winding current control unit 21 will be described.

Figure 3:
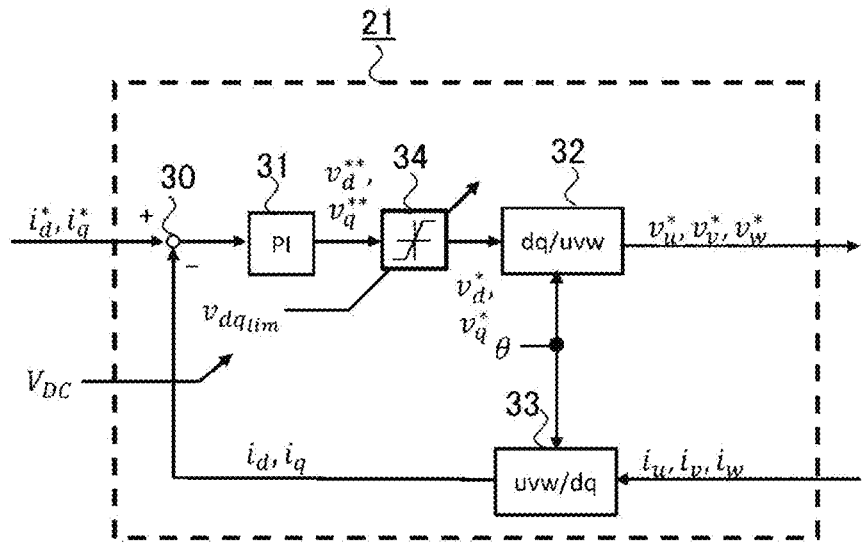
FIG. 3 is a block diagram showing a stator winding current control unit according to embodiment 1.

FIG. 3 shows the configuration of the stator winding current control unit 21 in the rotating machine control device 1000 according to embodiment 1. In FIG. 3, the stator winding current control unit 21 includes an adder/subtractor

30, a proportional integral (PI) controller 31, a dq/uvw coordinate converter 32, a uvw/dq coordinate converter 33, and a voltage limiter 34.

Operation of the stator winding current control unit 21 will be described.

The uvw/dq coordinate converter 33 converts the stator winding currents iu, iv, iw for the three phases detected by the current detector 4, to stator winding current detected values of d-axis current id and q-axis current iq, using a known coordinate conversion method.

The adder/subtractor 30 receives the stator winding current command values id*, iq* outputted from the current command generation unit 23 and the stator winding currents id, iq which are the current detected values outputted from the uvw/dq coordinate converter 33, and calculates stator winding current deviations (id*−id), (iq*−iq). On the basis of the calculated stator winding current deviations (id*−id), (iq*−iq), the PI controller 31 performs PI control, to generate stator winding voltage command values vd, vq.

Calculation examples in the PI controller 31 are shown in Expression (1) and Expression (2). Here, Kpd and Kid, and Kpq and Kiq, are proportional gains and integral gains of stator winding currents on the respective axes. In addition, s is a differential operator of Laplace transform. The same applies to the subsequent expressions.

$$vd^{**}=(Kpd+Kid/s)\cdot(id^*-id) \quad (1)$$

$$vq^{**}=(Kpq+Kiq/s)\cdot(iq^*-iq) \quad (2)$$

Here, vd and vq are calculated through feedback control. Alternatively, they may be calculated through feedforward control.

Although not shown, known decoupling control may be performed after generation of the stator winding voltage command values vd, vq as described above.

The voltage limiter 34 calculates stator winding voltage command values vd*, vq* so that, when the amplitudes of the inputted stator winding voltage command values vd, vq are greater than a stator winding voltage limitation value vdqlim, the amplitudes become equal to or smaller than the stator winding voltage limitation value vdqlim. The stator winding voltage limitation value vdqlim is calculated as a product of the stator winding DC link voltage VDC and a voltage utilization factor.

Although not shown, when the voltage amplitudes of the stator winding voltage command values vd and vq are limited by the voltage limiter 34, an integrator of the PI controller 31 may be subjected to anti-windup processing. Here, the voltage limiter 34 limits the stator winding voltage command values vd, vq, but the stator winding DC link voltage VDC may be limited, instead of the stator winding voltage command values vd, vq.

The dq/uvw coordinate converter 32 converts the stator winding voltage command values vd*, vq* to the three-phase voltage command values vu*, vv*, vw*, using a known coordinate conversion method.

Next, the field winding current control unit 22 will be described.

Figure 4:
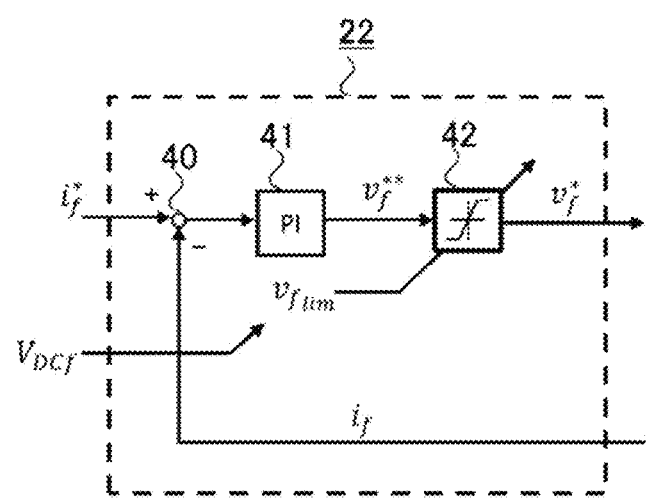
FIG. 4 is a block diagram showing a field winding current control unit according to embodiment 1.

FIG. 4 shows the configuration of the field winding current control unit 22 in the rotating machine control device 1000 according to embodiment 1. In FIG. 4, the field winding current control unit 22 includes an adder/subtractor 40, a PI controller 41, and a voltage limiter 42.

Operation of the field winding current control unit 22 will be described.

The adder/subtractor 40 receives the field winding current command value if* outputted from the current command generation unit 23 and the field winding current if detected by the current detector 5, and calculates a field winding current deviation (if*−if). On the basis of the calculated field winding current deviation (if*−if), the PI controller 41 performs PI control, to generate a field winding voltage command value vf**.

A calculation example in the PI controller 41 is shown in Expression (3). Here, Kpf and Kif are a field winding proportional gain and a field winding proportional integral gain, respectively.

$$vf^{**}=(Kpf+Kif/s)\cdot(if^*-if) \quad (3)$$

Although not shown, known decoupling control may be performed after generation of the field winding voltage command value vf as described above. Here, the field winding voltage command value vf is calculated through feedback control. Alternatively, the field winding voltage command value vf** may be calculated through feedforward control.

The voltage limiter 42 calculates the field winding voltage command value vf* so that, when the amplitude of the field winding voltage command value vf** is greater than a field winding voltage limitation value vflim, the amplitude becomes equal to or smaller than the field winding voltage limitation value vflim. The field winding voltage limitation value vflim is calculated as a product of the field winding DC link voltage VDCf and a voltage utilization factor.

Although not shown, when the voltage amplitude of the field winding voltage command value vf is limited by the voltage limiter 42, an integrator of the PI controller 41 may be subjected to anti-windup processing. Here, the voltage limiter 42 limits the field winding voltage command value vf, but the field winding DC link voltage VDCf may be limited, instead of the field winding voltage command value vf**.

Next, the current command generation unit 23 will be described.

Figure 5:
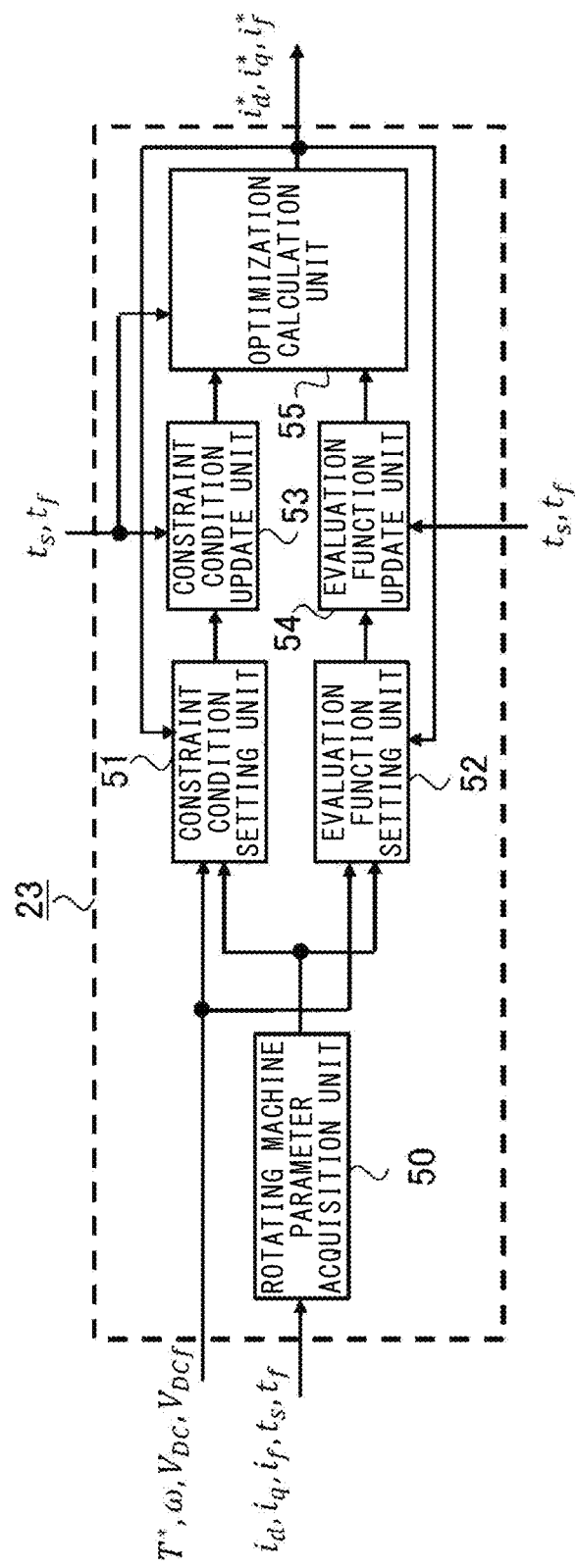
FIG. 5 is a block diagram showing a current command generation unit according to embodiment 1.

FIG. 5 shows the configuration of the current command generation unit 23 in the rotating machine control device 1000 according to embodiment 1. In FIG. 5, the current command generation unit 23 includes a rotating machine parameter acquisition unit 50, a constraint condition setting unit 51, an evaluation function setting unit 52, a constraint condition update unit 53, an evaluation function update unit 54, and an optimization calculation unit 55.

The rotating machine parameter acquisition unit 50 acquires a stator winding resistance R, a field winding resistance Rf, stator winding inductances Ld, Lq, a mutual inductance M between the stator winding and the field winding, and a magnet magnetic flux KE, as rotating machine parameters, on the basis of the stator winding currents id, iq converted by the stator winding current control unit 21, the field winding current if detected by the current detector 5, and the stator winding temperature ts and the field winding temperature tf acquired by the temperature information acquisition unit 24. In addition, the rotating machine parameters are updated in accordance with the stator winding temperature ts and the field winding temperature tf acquired by the temperature information acquisition unit 24.

The rotating machine parameter acquisition unit 50 may acquire not only the stator winding currents id, iq, the field winding current if, the stator winding temperature ts, and the field winding temperature tf, but also command current or voltage, etc., as an argument. As rotating machine parameters, not only the stator winding resistance R, the field winding resistance Rf, the stator winding inductances Ld, Lq, the mutual inductance M between the stator winding and the field winding, and the magnet magnetic flux KE, but also a field winding inductance Lf may be acquired. In a case of a rotating machine of a double three-phase-winding type, the mutual inductance between stators, or the like, may be set as a rotating machine parameter, or rotating machine parameters may be represented by not only inductance notation but also magnetic flux notation.

The constraint condition setting unit 51 sets a constraint condition on the basis of the torque command T*, the rotor velocity ω, the DC link voltages VDC, VDCf, the rotating machine parameters outputted from the rotating machine parameter acquisition unit 50, and the current command values id*, iq*, if* outputted from the optimization calculation unit 55. In the constraint condition setting unit 51, the detected currents id, iq, if may be used instead of the current command values id*, iq*, if*.

The evaluation function setting unit 52 sets an evaluation function on the basis of the torque command T*, the rotor velocity ω, the DC link voltages VDC, VDCf, the rotating machine parameters outputted from the rotating machine parameter acquisition unit 50, and the current command values id*, iq*, if* outputted from the optimization calculation unit 55. In the evaluation function setting unit 52, the detected currents id, iq, if may be used instead of the current command values id*, iq*, if*, as in the constraint condition setting unit 51.

Next, a constraint condition setting method by the constraint condition setting unit 51 and an evaluation function setting method by the evaluation function setting unit 52 will be specifically described for each of ten command modes below.

In FIG. 6, conditions for each command mode are shown. Condition a: torque command limitation is represented as 0 in a range until the torque command reaches the torque command maximum value, and represented as 1 in a case where the torque command has reached the torque command maximum value and thus is saturated. Condition b: voltage limitation is represented as 0 in a range until voltage vdq reaches a voltage maximum value vdqmax, and represented as 1 in a case where the voltage vdq has reached the voltage maximum value vdqmax and thus is saturated. Condition c: field winding current limitation is represented as 0 in a range until the field winding current if reaches a field winding current maximum value ifmax, and represented as 1 in a case where the field winding current if has reached the field winding current maximum value ifmax and thus is saturated. Condition d: stator winding current limitation is represented as 0 in a range until the stator winding currents id, iq reach a stator winding current amplitude maximum value idqmax, and represented as 1 in a case where the stator winding currents id, iq have reached the stator winding current amplitude maximum value idqmax and thus is saturated.

<Command Mode 1>

At an operating point, in a case where the torque command can be outputted, the voltage is within voltage limitation, and the stator winding currents and the field winding current are within current limitation, the constraint condition is set as shown by Expression (4) and the evaluation function is set as shown by Expression (5).

[Mathematical 1]

$$(L_d-L_q)i_d i_q + (K_E+Mi_f)i_q - C_T = 0 \quad (4)$$

[Mathematical 2]

$$Pw = R(i_d^2 + i_q^2) + R_f i_f^2 \quad (5)$$

Expression (4) represents torque, and Expression (5) represents copper loss. Here, CT is a value obtained by dividing the torque command T* by the number of pole pairs Pn, Pw is loss, Ld, Lq, and M are a d-axis inductance, a q-axis inductance, and a mutual inductance between the stator winding and the field winding, respectively, and KE is a magnet magnetic flux. Although the case where the evaluation function represents copper loss as an index is shown here, the evaluation function may represent another loss such as iron loss, or a power factor, as an index (such description is omitted in the following description). In a case of using a power factor as the evaluation function, setting is made such that the power factor is maximized.

With Expression (4) set as the constraint condition, id, iq, and if that minimize the Expression (5) are calculated, whereby it is possible to calculate the current command values that minimize loss, under the torque command value. This condition is defined as command mode 1.

<Command Mode 2>

At an operating point, in a case where the torque command can be outputted, the voltage is within voltage limitation, the stator winding currents are within current limitation, and the field winding current is saturated, the constraint condition is set as shown by Expression (6) and the evaluation function is set as shown by Expression (7).

[Mathematical 3]

$$(L_d-L_q)i_d i_q + (K_E+Mi_{fmax})i_q - C_T = 0 \quad (6)$$

[Mathematical 4]

$$Pw = R(i_d^2 + i_q^2) + R_f i_{fmax}^2 \quad (7)$$

Here, ifmax denotes a field winding current maximum value. In a case where the field winding voltage is greater than the field winding voltage maximum value vfmax (vfmax=kf×VDCf, where kf is a voltage utilization factor), ifmax is changed so that the field winding voltage becomes equal to or smaller than vfmax.

With Expression (6) set as the constraint condition, id and iq that minimize Expression (7) are calculated, whereby it is possible to calculate the current command values that minimize loss when the field winding current is saturated, under the torque command value. This condition is defined as command mode 2.

<Command Mode 3>

At an operating point, in a case where the torque command can be outputted, the voltage is within voltage limitation, the field winding current is within current limitation, and the stator winding currents are saturated, the constraint condition is set as shown by Expression (8) and the evaluation function is set as shown by Expression (9).

[Mathematical 5]

$$(L_d-L_q)i_d\sqrt{i_{dqmax}^2-i_d^2} + (K_E+Mi_f)\sqrt{i_{dqmax}^2-i_d^2} - C_T = 0 \quad (8)$$

[Mathematical 6]

$$Pw = R(i_d^2 + (i_{dqmax}^2 - i_d^2)) + R_f i_f^2 \quad (9)$$

Here, idqmax denotes a stator winding current amplitude maximum value.

With Expression (8) set as the constraint condition, id and if that minimize Expression (9) are calculated, whereby it is possible to calculate the current command values that minimize loss when the stator winding currents are saturated, under the torque command value. This condition is defined as command mode 3.

<Command Mode 4>

At an operating point, in a case where the torque command cannot be outputted, the voltage is within voltage limitation, and the stator winding currents and the field winding current are saturated, the constraint condition is set as shown by Expression (10) and the evaluation function is set as shown by Expression (11).

[Mathematical 7]

$$iq = \sqrt{i_{dqmax}^2 - i_d^2}, i_f = i_{fmax} \tag{10}$$

[Mathematical 8]

$$(L_d - L_q)i_d\sqrt{i_{dqmax}^2 - i_d^2} + (K_E + Mi_f)\sqrt{i_{dqmax}^2 - i_d^2} - C_T = 0 \tag{11}$$

With Expression (10) set as the constraint condition, id that maximizes Expression (11) is calculated, whereby it is possible to calculate the current command values that achieve maximum torque when the stator winding currents and the field winding current are saturated. This condition is defined as command mode 4.

<Command Mode 5>

At an operating point, in a case where the torque command can be outputted, the voltage is saturated, and the stator winding currents and the field winding current are within current limitation, the constraint condition is set as shown by Expressions (12) and (13) and the evaluation function is set as shown by Expression (14).

[Mathematical 9]

$$(L_d - L_q)i_d i_q + (K_E + Mi_f)i_q - C_T = 0 \tag{12}$$

[Mathematical 10]

$$(L_q i_q)^2 + (L_d i_d + K_E + Mi_f)^2 - C_V^2 = 0 \tag{13}$$

[Mathematical 11]

$$Pw = R(i_d^2 + i_q^2) + R_f i_f^2 \tag{14}$$

Expression (13) is obtained by dividing steady voltage of the rotating machine by an angular velocity care, and CV denotes a value obtained by dividing the voltage limitation value vdqmax (vdqmax=k×VDC, where k is a voltage utilization factor) by the angular velocity care.

With Expressions (12) and (13) set as the constraint condition, id, iq, and if that minimize Expression (14) are calculated, whereby it is possible to calculate the current command values that minimize loss when voltage is saturated, under the torque command value. This condition is defined as command mode 5.

<Command Mode 6>

At an operating point, in a case where the torque command can be outputted, the voltage is saturated, the stator winding currents are within current limitation, and the field winding current is saturated, the constraint condition is set as shown by Expressions (15) and (16), while the evaluation function is not set. In this case, id, iq, and if that satisfy Expressions (15) and (16) set as the constraint condition are calculated.

[Mathematical 12]

$$(L_q i_q)^2 + (L_d i_d + K_E + Mi_{fmax})^2 - C_V^2 = 0 \tag{15}$$

[Mathematical 13]

$$(L_d - L_q)i_d i_q + (K_E + Mi_{fmax})i_q - C_T = 0 \tag{16}$$

With Expressions (15) and (16) set as the constraint condition, id and iq are calculated, whereby it is possible to calculate the current command values when the voltage is saturated and the field winding current is saturated, under the torque command value. This condition is defined as command mode 6.

<Command Mode 7>

At an operating point, in a case where the torque command can be outputted, the voltage is saturated, the stator winding currents are saturated, and the field winding current is within current limitation, the constraint condition is set as shown by Expressions (17) and (18), while the evaluation function is not set.

[Mathematical 14]

$$\{(L_d - L_q) + (K_E + Mi_f)\}\sqrt{i_{dqmax}^2 - i_d^2} - C_T = 0 \tag{17}$$

[Mathematical 15]

$$(L_q\sqrt{i_{dqmax}^2 - i_d^2})^2 + (L_d i_d + K_E + Mi_f)^2 - C_V^2 = 0 \tag{18}$$

With Expressions (17) and (18) set as the constraint condition, id and if are calculated, whereby it is possible to calculate the current command values when the voltage is saturated and the stator winding currents are saturated, under the torque command value. This condition is defined as command mode 7.

<Command Mode 8>

At an operating point, in a case where the torque command cannot be outputted, the voltage is saturated, the stator winding currents are within current limitation, and the field winding current is saturated, the constraint condition is set as shown by Expression (19) and the evaluation function is set as shown by Expression (20).

[Mathematical 16]

$$(L_q i_q)^2 + (L_d i_d + K_E + Mi_{fmax})^2 - C_V^2 = 0 \tag{19}$$

[Mathematical 17]

$$(L_d - L_q)i_d i_q + (K_E + Mi_{fmax})i_q - C_T = 0 \tag{20}$$

With Expression (19) set as the constraint condition, id and iq that maximize Expression (20) are calculated, whereby it is possible to calculate the current command values that achieve maximum torque when the voltage is saturated and the field winding current is saturated. This condition is defined as command mode 8.

<Command Mode 9>

At an operating point, in a case where the torque command cannot be outputted, the voltage is saturated, the stator winding currents are saturated, and the field winding current is within current limitation, the constraint condition is set as shown by Expression (21) and the evaluation function is set as shown by Expression (22).

[Mathematical 18]

$$(L_q\sqrt{i_{dqmax}^2 - i_d^2})^2 + (L_d i_d + K_E + Mi_f)^2 - C_V^2 = 0 \tag{21}$$

[Mathematical 19]

$$\{(L_d - L_q) + (K_E + Mi_f)\}\sqrt{i_{dqmax}^2 - i_d^2} - C_T = 0 \tag{22}$$

With Expression (21) set as the constraint condition, id and if that maximize Expression (22) are calculated, whereby it is possible to calculate the current command values that achieve maximum torque when the voltage is saturated and the stator winding currents are saturated. This condition is defined as command mode 9.

<Command Mode 10>

At an operating point, in a case where the torque command cannot be outputted, the voltage is saturated, and the stator winding currents and the field winding current are saturated, the constraint condition is set as shown by Expression (23) and the evaluation function is set as shown by Expression (24).

[Mathematical 20]

$$(L_q\sqrt{i_{dqmax}^2-i_d^2})^2+(L_d i_d+K_E+Mi_{fmax})^2-C_V^2=0 \tag{23}$$

[Mathematical 21]

$$\frac{(L_d-L_q)i_d\sqrt{i_{dqmax}^2-i_d^2}+(K_E+Mi_{fmax})}{\sqrt{i_{dqmax}^2-i_d^2}}-C_T=0 \tag{24}$$

With Expression (23) set as the constraint condition, id that maximizes Expression (24) is calculated, whereby it is possible to calculate the current command values that achieve maximum torque when the voltage is saturated and the stator winding currents and the field winding current are saturated. This condition is defined as command mode 10.

As described above, by setting the conditions of the command modes 1 to 10, it is possible to set the constraint condition and the evaluation function for all the operating points based on the velocity and torque of the rotating machine. Thus, on the basis of conditions of the torque command, the stator winding voltages, the stator winding currents, and the field winding current, the constraint condition and the evaluation function among the command modes 1 to 10 are set and then the constraint condition and the evaluation function are solved, whereby it is possible to calculate the current command values that minimize loss or achieve maximum torque.

In the command modes 1 to 10, the expressions representing torque and voltage are described by inductance notation, but magnetic flux notation may be used instead of inductance notation. In addition, since the inductance and the magnetic flux are represented as functions of current, if notation by a function of current is used, magnetic saturation can be taken into consideration, whereby calculation accuracy is improved. In addition, since the magnet magnetic flux and the winding resistances are parameters that change in accordance with the temperature, notation by a function of temperature or current may be used, whereby calculation accuracy is improved in the same manner.

<Update of Constraint Condition and Evaluation Function>

In FIG. 5, the constraint condition update unit 53 performs constraint condition update on the basis of the constraint condition from the constraint condition setting unit 51 and the stator winding temperature ts and the field winding temperature tf from the temperature detector 3.

The evaluation function update unit 54 performs evaluation function update on the basis of the evaluation function from the evaluation function setting unit 52 and the stator winding temperature ts and the field winding temperature tf from the temperature detector 3.

Next, specific operations of the constraint condition update unit 53 and the evaluation function update unit 54 will be described. The stator winding current limitation value idqlim and the field winding current limitation value iflim are calculated so that the stator winding temperature ts and the field winding temperature tf detected by the temperature detector 3 do not exceed a stator winding temperature maximum value tsmax and a field winding temperature maximum value tfmax. When the stator winding current limitation value idqlim is smaller than the stator winding current amplitude maximum value idqmax set for overcurrent protection, idqmax in the constraint condition from the constraint condition setting unit 51 and the evaluation function from the evaluation function setting unit 52 is replaced with idqlim.

Similarly, when the field winding current limitation value iflim is smaller than the field winding current maximum value ifmax set for overcurrent protection, ifmax in the constraint condition from the constraint condition setting unit 51 and the evaluation function from the evaluation function setting unit 52 is replaced with iflim. As described above, the current maximum values for overcurrent protection of the stator winding and the field winding in the constraint condition and the evaluation function are replaced with the current limitation values for overheat protection, whereby it is possible to set the constraint condition and the evaluation function while considering the stator winding temperature ts and the field winding temperature tf which constantly change in accordance with operation, for all the operating points based on the velocity and torque of the rotating machine.

Here, the example in which the stator winding current limitation value idqlim and the field winding current limitation value iflim are calculated on the basis of the stator winding temperature ts and the field winding temperature tf, has been shown. However, the stator winding current limitation value idqlim and the field winding current limitation value iflim may be calculated from the temperature of a component such as a magnet composing the rotating machine or the temperature of a power converter, etc., instead of the stator winding temperature ts and the field winding temperature tf. In particular, in a case of using the temperature of a magnet, basically, it is only necessary to replace the field winding temperature tf with the magnet temperature, and a configuration may be made such that the field winding current limitation value iflim is limited in accordance with the magnet temperature.

In addition, the limitation values are not limited to currents. For example, the stator winding voltage maximum value vdqmax and the field winding voltage maximum value vfmax may be used and may be replaced with the stator winding voltage limitation value vdqlim and the field winding voltage limitation value vflim in accordance with the detected stator winding temperature ts and field winding temperature tf.

In the present embodiment, the configuration in which the constraint condition and the evaluation function are updated in accordance with the detected temperature information, is used. However, a configuration in which the constraint condition and the evaluation function are updated in accordance with power consumption or current application periods instead of the temperature, may be used.

<Optimization Calculation Unit>

In FIG. 5, in the optimization calculation unit 55, on the basis of the constraint condition and the evaluation function updated by the constraint condition update unit 53 and the evaluation function update unit 54, an optimization problem for minimizing or maximizing the evaluation function with the constraint condition is solved, to select the command mode closest to the condition, thereby obtaining the current command values id*, iq*, if*. Specifically, in accordance with flowcharts shown in FIG. 7A, FIG. 7B, and FIG. 7C, which of the above command modes should be used is determined on the basis of determination expressions for current limitation, voltage limitation, and torque output limitation. The determination expressions for current limitation, voltage limitation, and torque output limitation are constantly updated in accordance with the detected temperature information.

Next, in accordance with the flowcharts shown in FIG. 7A, FIG. 7B, and FIG. 7C, a method for determining which of the command modes is applied at the operating point will be described.

Figure 7A:
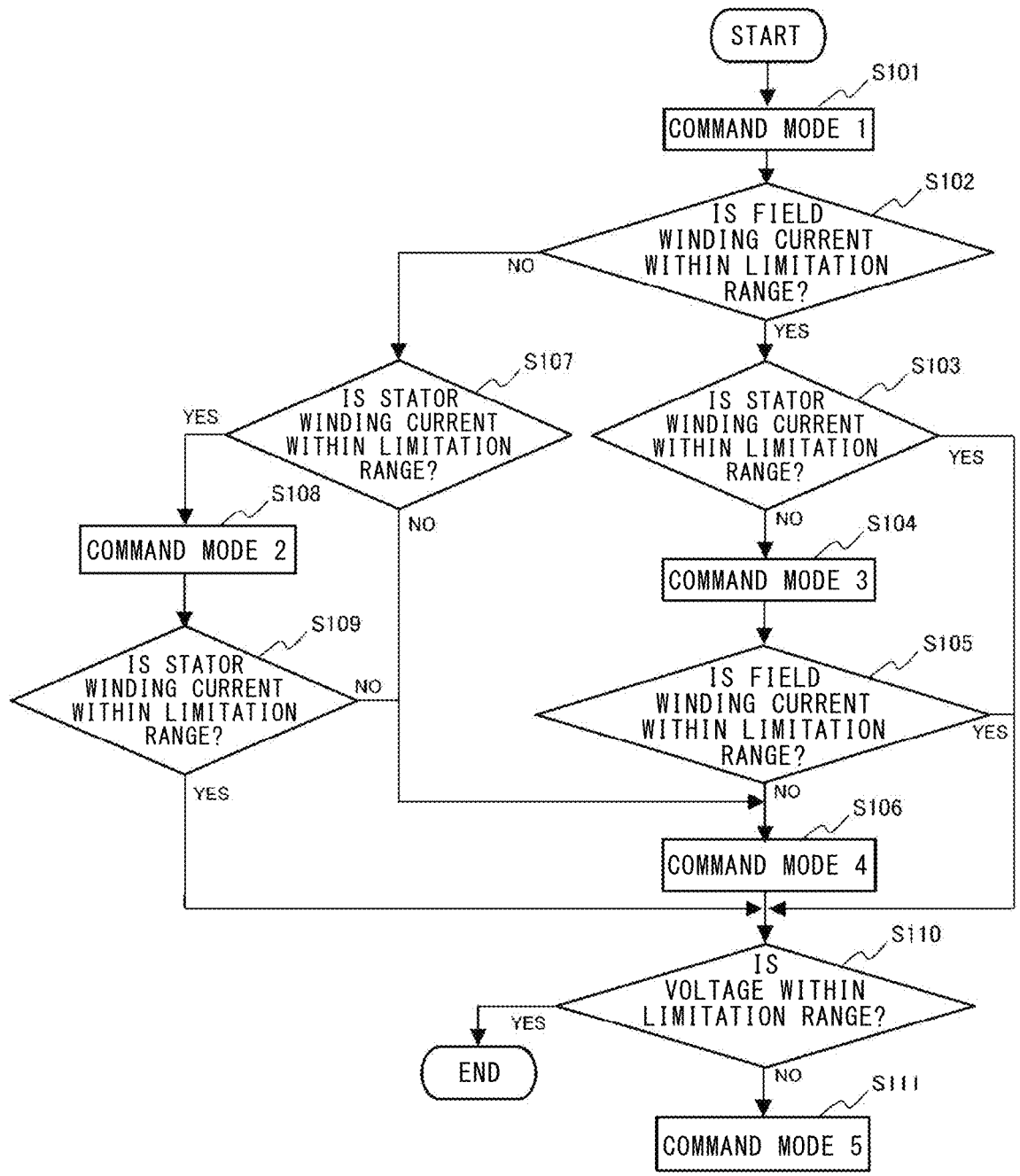
FIG. 7A is a flowchart showing a calculation flow in an optimization calculation unit according to embodiment 1.

First, in FIG. 7A, on the basis of the torque command, the stator winding current command values id*, iq* and the field winding current command value if* are generated in the optimization calculation unit 55, whereby currents flow through the stator winding and the field winding. In step S101 when currents start to flow through the stator windings and the field winding, the command mode 1 is applied. During current application, the winding temperatures are increased. As the temperatures are increased, if the field winding current if is within the limitation range (YES in step S102) but the stator winding currents id, iq are saturated (NO in step S103), the command mode is switched to the command mode 3 (step S104). During operation in the command mode 3, if the field winding current if is also saturated (NO in step S105), the command mode is switched to the command mode 4 (step S106).

During operation in the command mode 1 (step S101), if the field winding current if is saturated (NO in step S102) but the stator winding currents id, iq are within the limitation range (YES in step S107), the command mode is switched to the command mode 2 (step S108). During operation in the command mode 2, if the stator winding currents id, iq are also saturated (NO in step S109), the command mode is switched to the command mode 4 (step S106).

During operation in the command mode 1 (step S101), if the field winding current if is saturated (NO in step S102) and the stator winding currents id, iq are saturated (NO in step S107), the command mode is switched to the command mode 4 (step S106).

During operation in each of the command modes 2 to 4, if the voltage vdq is saturated (NO in step S110), the command mode is switched to the command mode 5 (step S111).

If the voltage vdq is within the limitation range and control can be performed in each of the command modes 2 to 4 (YES in step S110), the control in the present command mode is continued.

Figure 7B:
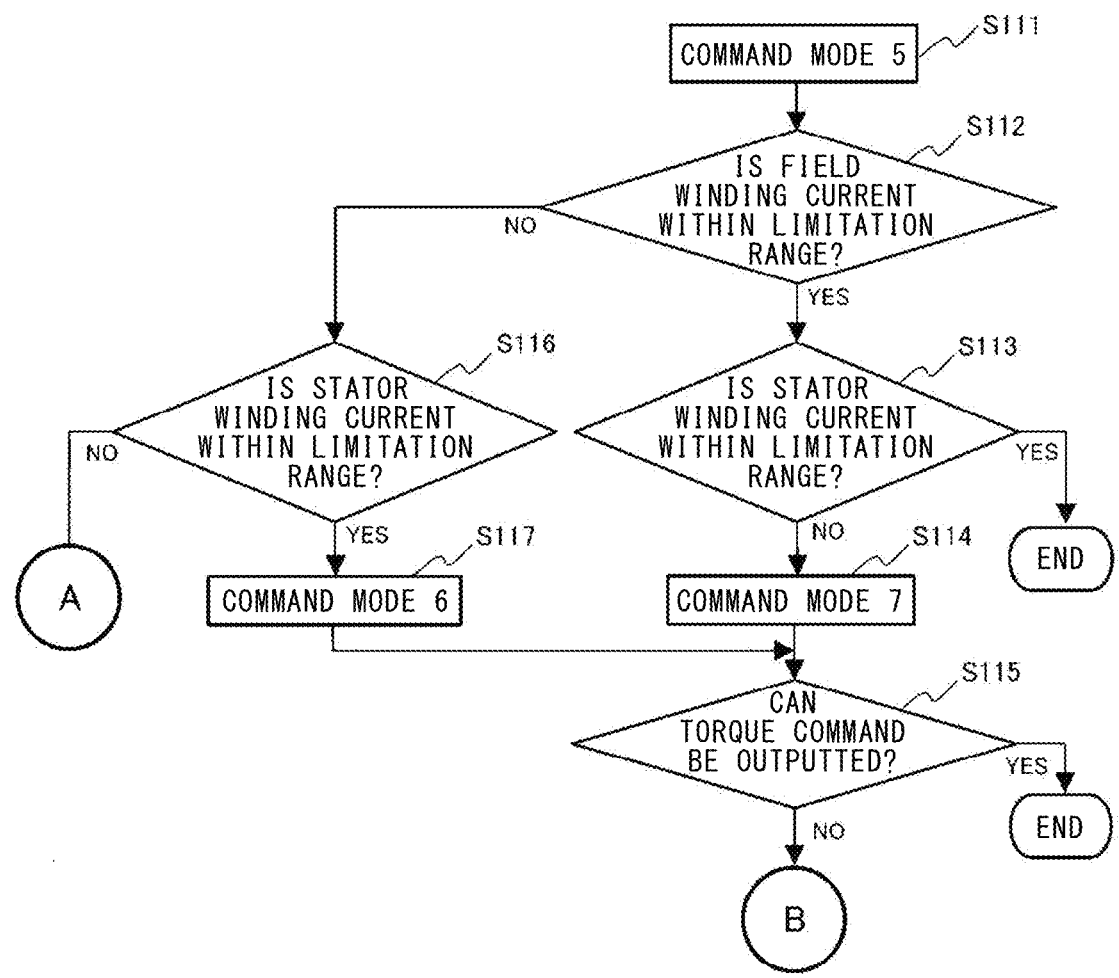
FIG. 7B is a flowchart showing a calculation flow in the optimization calculation unit according to embodiment 1.

In FIG. 7B, during operation in the command mode 5, if the field winding current if is within the limitation range (YES in step S112) and the stator winding currents id, iq are also within the limitation range (YES in step S113), the control in the command mode 5 is continued.

During operation in the command mode 5, if the field winding current if is within the limitation range (YES in step S112) and the stator winding currents id, iq are saturated (NO in step S113), the command mode is switched to the command mode 7 (step S114).

During operation in the command mode 5, if the field winding current if is saturated (NO in step S112) but the stator winding currents id, iq are within the limitation range (YES in step S116), the command mode is switched to the command mode 6 (step S117).

During operation in the command mode 5, if the field winding current if is saturated (NO in step S112) and the stator winding currents id, iq are also saturated (NO in step S116), the command mode is switched to the command mode 10 (step S125).

During operation in the command mode 6 or the command mode 7, if the torque output T can be outputted on the basis of the torque command 1* (YES in step S115), the control in the present command mode is continued.

Figure 7C:
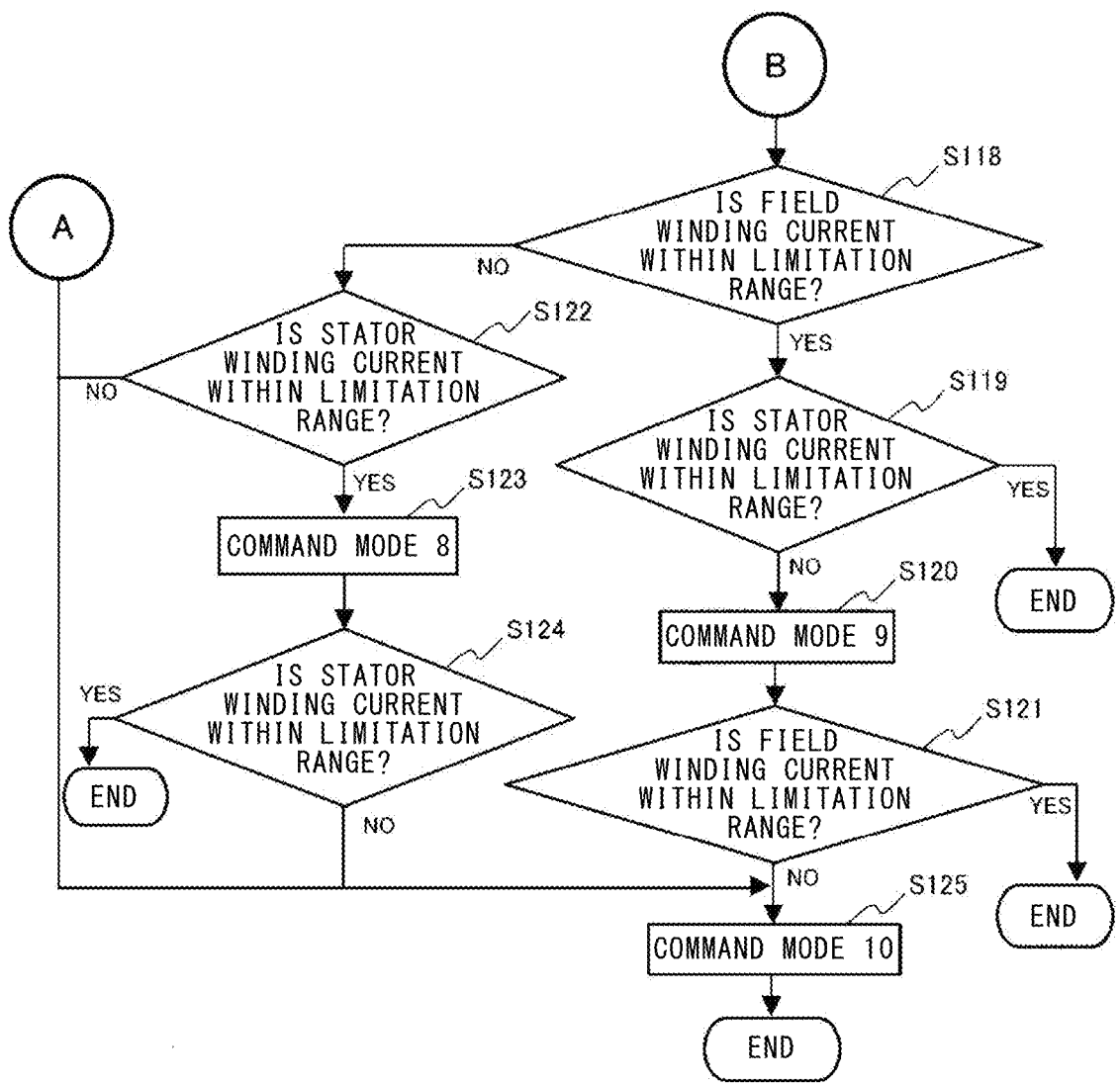
FIG. 7C is a flowchart showing a calculation flow in the optimization calculation unit according to embodiment 1.

During operation in the command mode 6 or the command mode 7, if the torque output T cannot be outputted on the basis of the torque command 1* (NO in step S115), the process proceeds to the next determination in FIG. 7C.

During operation in the command mode 6 or the command mode 7, when the torque output T cannot be outputted on the basis of the torque command 1* (NO in step S115), if the field winding current if is within the limitation range (YES in step S118) and the stator winding currents id, iq are also within the limitation range (YES in step S119), the control in the command mode 6 or 7 is continued.

When the torque output T cannot be outputted on the basis of the torque command T* (NO in step S115), if the field winding current if is within the limitation range (YES in step S118) and the stator winding currents id, iq are saturated (NO in step S119), the command mode is switched to the command mode 9 (step S120).

When the torque output T cannot be outputted on the basis of the torque command 1* (NO in step S115), if the field winding current if is saturated (NO in step S118) but the stator winding currents id, iq are within the limitation range (YES in step S122), the command mode is switched to the command mode 8 (step S123).

During operation in the command mode 8, if the stator winding currents id, iq are saturated (NO in step S124), or during operation in the command mode 9, if the field winding current if is saturated (NO in step S121), the command mode is switched to the command mode 10 (step S125).

As described above, the current command generation unit 23 has a plurality of pairs of constraint conditions and evaluation functions which are a plurality of command modes in accordance with the conditions of the torque command, the stator winding voltages, the stator winding currents, and the field winding current, and can select an appropriate command mode in accordance with the condition at each time and update the constraint condition and the evaluation function.

For calculation in each command mode, in view of the calculation load, the optimization problem with the constraint condition is prepared as a function in advance, using the method of Lagrange multiplier. Since the function obtained by the method of Lagrange multiplier is derived as simultaneous equations, the current command values id*, iq*, if* are calculated per set control cycle through recursive numerical solution by Newton's method or the like. Processes of partial differentiation and the like to be used for deriving solutions by the method of Lagrange multiplier and Newton's method may be prepared as functions in advance, whereby the calculation load is reduced. However, it is not always necessary to prepare such functions in advance if, for example, there is some allowance in the processor. A configuration may be made such that the optimization problem with the constraint condition is solved per set control cycle.

With the current command generation unit 23 configured as described above, it becomes possible to generate the current command values that achieve the torque command or maximum torque while minimizing loss and protecting the rotating machine from overheating, without having maps of the current command values based on the velocity, torque, stator winding temperature, and field winding temperature of the rotating machine.

Figure 8:
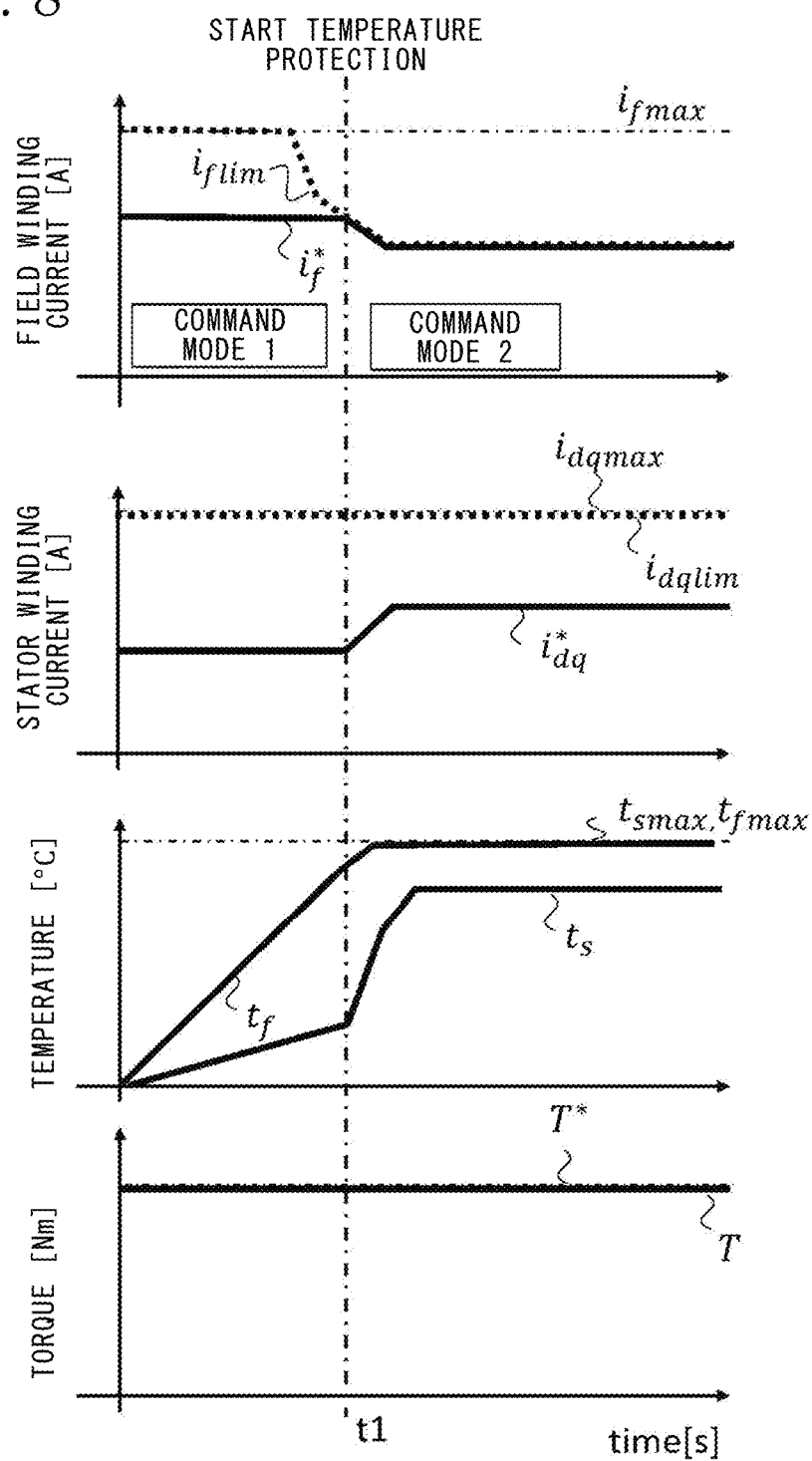
FIG. 8 shows a control example of the rotating machine control device according to embodiment 1.
Figure 9:
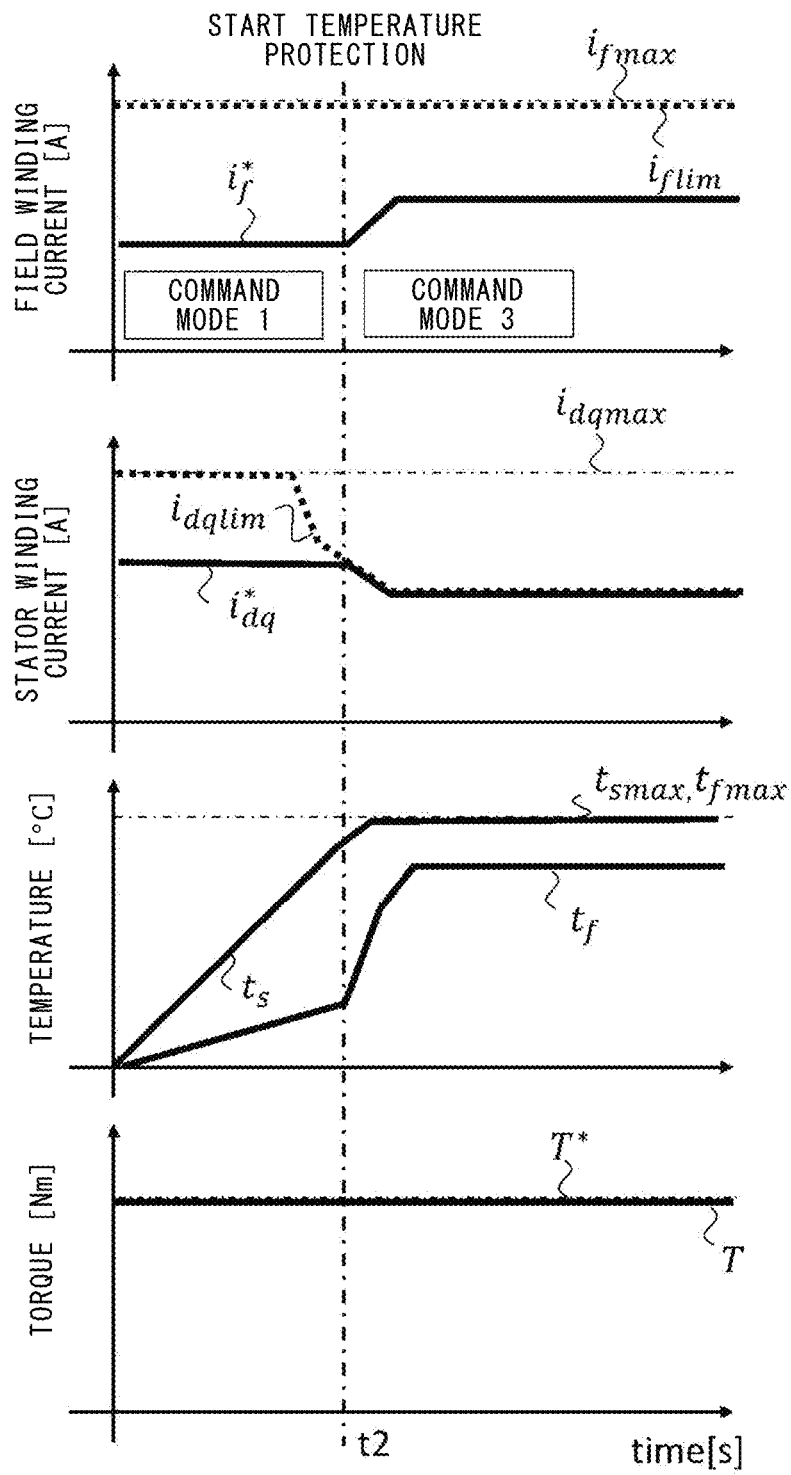
FIG. 9 is a control example of the rotating machine control device according to embodiment 1.

Next, the effects of the present embodiment will be described. FIG. 8 shows the behaviors of the current amplitudes and the temperatures of the respective windings, and torque, corresponding to operations of the current limitation values and the current command values, in a case of protecting the field winding temperature when the field winding temperature is increased. FIG. 9 shows the behaviors of the current amplitudes and the temperatures of the respective windings, and torque, corresponding to operations of the current limitation values and the current command values, in a case of protecting the stator winding temperature when the stator winding temperature is increased. Here, description will be given using the command mode 1 when the stator winding currents, the field winding current, and the voltage are not saturated, as a simple example.

First, with reference to FIG. 8, a case of protecting the field winding temperature will be described.

On the basis of the torque command, the stator winding current command values id*, iq* and the field winding current command value if* are generated in the optimization calculation unit 55, whereby currents flow through the stator winding and the field winding. During current application, the winding temperatures are increased. In FIG. 8, while the field winding temperature tf is greatly increased, in accordance with the field winding temperature tf, the constraint condition is updated in the constraint condition update unit 53 and the evaluation function is updated in the evaluation function update unit 54, and the field winding current limitation value iflim is decreased so that the field winding temperature tf does not exceed the field winding temperature maximum value tfmax.

When the field winding current limitation value iflim has reached the field winding current command value if*, i.e., at time t1 when iflim has become equal to or smaller than if*, the command mode is switched from the command mode 1 to the command mode 2 in the optimization calculation unit 55. The field winding current command value if* is limited so as to prevent overheating of the field winding, and for the stator winding whose temperature is within the limitation range, the stator winding current command values id*, iq* are generated so as to minimize the evaluation function under the constraint condition in the command mode 2. Here, the constraint condition is that if =iflim and torque output T=T* are satisfied. Through the above control, overheating of the field winding can be prevented and torque reduction can be suppressed.

In FIG. 8, for simplification, currents are shown as current amplitudes, but normally, current phases are also changed. When iflim has become equal to or smaller than if*, the command mode is switched from the command mode 1 to the command mode 2 by the optimization calculation unit 55. At this time, the field winding current command value if* is limited so as to prevent overheating of the field winding with the current phase also taken into consideration, and for the stator winding whose temperature is within the limitation range, the current command values id*, iq* are generated so as to minimize the evaluation function under the constraint condition in the command mode 2.

Next, with reference to FIG. 9, a case of protecting the stator winding temperature will be described.

On the basis of the torque command, the stator winding current command values id*, iq* and the field winding current command value if* are generated in the optimization calculation unit 55, whereby currents flow through the stator winding and the field winding. During current application, the winding temperatures are increased. In FIG. 9, while the stator winding temperature ts is greatly increased, in accordance with the stator winding temperature ts, the constraint condition is updated in the constraint condition update unit 53 and the evaluation function is updated in the evaluation function update unit 54, and the stator winding current limitation value idqlim is decreased so that the stator winding temperature ts does not exceed the stator winding temperature maximum value tsmax.

When the stator winding current limitation value idqlim has reached a stator winding current command value idq* (the stator winding current command value id* or the stator winding current command value iq* is denoted by idq*), i.e., at time t2 when idqlim has become equal to or smaller than idq*, the command mode is switched from the command mode 1 to the command mode 3 in the optimization calculation unit 55. The stator winding current command value idq* is limited so as to prevent overheating of the stator winding, and for the field winding whose temperature is within the limitation range, the current command value if* is generated so as to minimize the evaluation function under the constraint condition in the command mode 3. Here, the constraint condition is that idq (id or iq)=idqlim and torque output T=T* are satisfied. Through the above control, overheating of the field winding can be prevented and torque reduction can be suppressed (the stator winding current id or the stator winding current iq is denoted by idq).

In FIG. 9, for simplification, currents are shown as current amplitudes, but normally, current phases are also changed. When idqlim has become equal to or smaller than idq*, the command mode is switched from the command mode 1 to the command mode 3 in the optimization calculation unit 55. At this time, the stator winding current command value idq* is limited so as to prevent overheating of the stator winding with the current phase also taken into consideration, and for the field winding whose temperature is within the limitation range, the current command value if* is generated so as to minimize the evaluation function under the constraint condition in the command mode 3.

As shown in FIG. 8 and FIG. 9, even when current of either the field winding or the stator winding is limited, if the torque T in accordance with the torque command T* can be outputted, the torque command may be maintained, but if the torque command T* cannot be physically outputted, the current command values may be generated so as to obtain maximum torque.

In FIG. 8 and FIG. 9 described above, the operation example in which the command mode is switched from the command mode 1 to the command mode 3, has been shown. In actuality, operation is performed while the command mode is switched among more command modes through the flowcharts shown in FIGS. 7A to 7C in accordance with the rotating machine temperature or the operating point based on the number of revolutions and torque.

As described above, according to embodiment 1, the constraint condition regarding torque output and the evaluation function for loss are optimized on the basis of acquired temperature information of a rotating machine, and the constraint condition and the evaluation function are updated on the basis of the acquired temperature information of the rotating machine, whereby the current commands for the stator winding and the field winding are calculated. Thus, optimization calculation can be performed in accordance with the temperature information of the rotating machine. Therefore, it becomes possible to suppress torque reduction and reduce loss while protecting the rotating machine from overheating when the winding temperature is increased, without using current command maps.

Since the rotating machine control device according to embodiment 1 controls a rotating machine so as to suppress torque reduction and reduce loss while performing protection from overheating when the winding temperature is increased, the rotating machine control device according to embodiment 1 is suitable for control of a rotating machine mounted to a vehicle for which suppression of torque reduction and reduction of loss are required under a severe temperature environment.

In the above embodiment, as a temperature, the stator winding temperature tf and the field winding temperature tf are used. However, in a case of a rotating machine using a magnet, the magnet temperature may be used instead of the field winding temperature tf, or parts corresponding to two or more of the stator winding temperature ts, the field winding temperature tf, and the magnet temperature may be protected. Also in such a case, the same effects are obtained.

Instead of a rotating machine having a stator winding and a field winding, for example, a rotating machine of a double three-phase winding type which has two sets of stator windings is also applicable. Also in this case, the same effects as in the present embodiment can be obtained by generating two sets of current commands in accordance with the temperatures of the two sets of stator windings. Further, also for a rotating machine of a double three-phase winding type having a field winding, the same effects can be obtained.

The constraint condition and the evaluation function may be changed on the basis of power consumption of a rotating machine calculated from a product of DC voltage and DC current of each power converter, a product of torque and the number of revolutions, or the like, instead of the temperatures of parts. Also in this case, the same effects can be obtained. A timer for counting a control cycle may be provided and the constraint condition and the evaluation function may be changed on the basis of measured current application periods of the stator winding and the field winding, instead of the temperatures of parts. Also in this case, the same effects can be obtained.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 rotating machine
2 position detector
3 temperature detector
4, 5 current detector
6 stator winding power converter
7 field winding power converter
10 processor
11 storage device
20 differentiator
21 stator winding current control unit
22 field winding current control unit
23 current command generation unit
24 temperature information acquisition unit
30, 40 adder/subtractor
31, 41 PI controller
32 dq/uvw coordinate converter
33 uvw/dq coordinate converter
34, 42 voltage limiter
50 rotating machine parameter acquisition unit
51 constraint condition setting unit
52 evaluation function setting unit
53 constraint condition update unit
54 evaluation function update unit
55 optimization calculation unit
1000 rotating machine control device

The invention claimed is:

1. A rotating machine control device for controlling a rotating machine having a stator winding and a field winding, the rotating machine control device comprising:
   a temperature information acquirer to acquire a temperature of the rotating machine; and
   a current command generator to generate a current command value on the basis of the temperature of the rotating machine acquired by the temperature information acquirer, wherein
   the current command generator includes
      a constraint condition setting circuitry to calculate a constraint condition on the basis of conditions of a torque command, stator winding voltage, stator winding current, and field winding current,
      an optimization calculator to calculate and output the current command value, using the constraint condition and an evaluation function set on the basis of the torque command, the stator winding voltage, the stator winding current, and the field winding current, and
      a constraint condition updater to update the constraint condition on the basis of the temperature of the rotating machine acquired by the temperature information acquirer, and
   the current command generator calculates and outputs the current command value, using the updated constraint condition.

2. The rotating machine control device according to claim 1, wherein
   the constraint condition updater changes a current limitation value for the stator winding and a current limitation value for the field winding in accordance with the acquired temperature of the rotating machine, to update the constraint condition.

3. The rotating machine control device according to claim 1, wherein
   the constraint condition updater changes a voltage limitation value for the stator winding and a voltage limitation value for the field winding in accordance with the acquired temperature of the rotating machine, to update the constraint condition.

4. The rotating machine control device according to claim 1, wherein
   the current command generator has, in advance, a plurality of pairs of the constraint conditions and the evaluation functions based on the conditions of the torque command, the stator winding voltage, the stator winding current, and the field winding current, and in accordance with the acquired temperature of the rotating machine, the current command generation unit selects the pair of the constraint condition and the evaluation function from among the plurality of pairs of the constraint conditions and the evaluation functions set in advance, and updates the constraint condition and the evaluation function.

5. The rotating machine control device according to claim 1, wherein
the optimization calculator calculates and outputs the current command value, using the evaluation function updated and the constraint condition updated in accordance with the acquired temperature of the rotating machine.

6. The rotating machine control device according to claim 1, wherein
the current command generator further includes a rotating machine parameter acquirer to acquire a rotating machine parameter indicating characteristics of the rotating machine, and updates the rotating machine parameter in accordance with the acquired temperature of the rotating machine, and
the constraint condition and the evaluation function are described using the rotating machine parameter.

7. The rotating machine control device according to claim 1, wherein
in a case where copper loss or iron loss which is loss in the rotating machine is used as an index, the evaluation function is set so as to minimize the index.

8. The rotating machine control device according to claim 1, wherein
in a case where a torque output or a power factor of the rotating machine is used as an index, the evaluation function is set so as to maximize the index.

9. The rotating machine control device according to claim 1, wherein
the rotating machine has a magnet at a rotor thereof, and
the temperature of the rotating machine is a temperature of at least one of the stator winding, the field winding, and the magnet.

10. A rotating machine control device for controlling a rotating machine having a stator winding and a field winding, the rotating machine control device comprising a current command generator to generate a current command value on the basis of power consumption of the rotating machine or current application periods of the stator winding and the field winding, wherein
the current command generator includes
a constraint condition setting circuitry to calculate a constraint condition on the basis of a torque command, stator winding voltage, stator winding current, and field winding current,
an optimization calculator to calculate and output the current command value, using the constraint condition and an evaluation function set on the basis of the torque command, the stator winding voltage, the stator winding current, and the field winding current, and
a constraint condition updater to update the constraint condition on the basis of the power consumption of the rotating machine or the current application periods of the stator winding and the field winding, and
the current command generator calculates and outputs the current command value, using the updated constraint condition.

11. The rotating machine control device according to claim 10, wherein
the rotating machine is mounted to a vehicle.

12. The rotating machine control device according to claim 1, wherein
the rotating machine is mounted to a vehicle.

13. The rotating machine control device according to claim 2, wherein
the current command generator has, in advance, a plurality of pairs of the constraint conditions and the evaluation functions based on the conditions of the torque command, the stator winding voltage, the stator winding current, and the field winding current, and
in accordance with the acquired temperature of the rotating machine, the current command generation unit selects the pair of the constraint condition and the evaluation function from among the plurality of pairs of the constraint conditions and the evaluation functions set in advance, and updates the constraint condition and the evaluation function.

14. The rotating machine control device according to claim 3, wherein
the current command generator has, in advance, a plurality of pairs of the constraint conditions and the evaluation functions based on the conditions of the torque command, the stator winding voltage, the stator winding current, and the field winding current, and
in accordance with the acquired temperature of the rotating machine, the current command generation unit selects the pair of the constraint condition and the evaluation function from among the plurality of pairs of the constraint conditions and the evaluation functions set in advance, and updates the constraint condition and the evaluation function.

15. The rotating machine control device according to claim 2, wherein
the current command generator further includes a rotating machine parameter acquirer to acquire a rotating machine parameter indicating characteristics of the rotating machine, and updates the rotating machine parameter in accordance with the acquired temperature of the rotating machine, and
the constraint condition and the evaluation function are described using the rotating machine parameter.

16. The rotating machine control device according to claim 3, wherein
the current command generator further includes a rotating machine parameter acquirer to acquire a rotating machine parameter indicating characteristics of the rotating machine, and updates the rotating machine parameter in accordance with the acquired temperature of the rotating machine, and
the constraint condition and the evaluation function are described using the rotating machine parameter.

17. The rotating machine control device according to claim 4, wherein
the current command generator further includes a rotating machine parameter acquirer to acquire a rotating machine parameter indicating characteristics of the rotating machine, and updates the rotating machine parameter in accordance with the acquired temperature of the rotating machine, and
the constraint condition and the evaluation function are described using the rotating machine parameter.

18. The rotating machine control device according to claim 5, wherein
the current command generator further includes a rotating machine parameter acquirer to acquire a rotating machine parameter indicating characteristics of the rotating machine, and updates the rotating machine parameter in accordance with the acquired temperature of the rotating machine, and the constraint condition and the evaluation function are described using the rotating machine parameter.

19. The rotating machine control device according to claim 2, wherein the rotating machine has a magnet at a rotor thereof, and the temperature of the rotating machine is a temperature of at least one of the stator winding, the field winding, and the magnet.

20. The rotating machine control device according to claim 3, wherein the rotating machine has a magnet at a rotor thereof, and the temperature of the rotating machine is a temperature of at least one of the stator winding, the field winding, and the magnet.

\* \* \* \* \*